US009929951B1

(12) United States Patent
Dickinson et al.

(10) Patent No.: US 9,929,951 B1
(45) Date of Patent: Mar. 27, 2018

(54) TECHNIQUES FOR USING MAPPINGS TO MANAGE NETWORK TRAFFIC

(75) Inventors: Andrew B. Dickinson, Seattle, WA (US); Frederick David Sinn, Seattle, WA (US); Bradley D. Roberts, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/114,769

(22) Filed: May 24, 2011

(51) Int. Cl.
*H04L 12/749* (2013.01)
*H04L 29/08* (2006.01)
*H04L 29/12* (2006.01)

(52) U.S. Cl.
CPC ........ *H04L 45/741* (2013.01); *H04L 29/0827* (2013.01); *H04L 61/251* (2013.01)

(58) Field of Classification Search
CPC ......... H04L 45/00; H04L 29/00; H04L 69/00; H04L 29/0827; H04L 61/251; H04L 45/741; H04L 61/00
USPC ................................ 709/223, 230, 246, 249
See application file for complete search history.

(56) References Cited

U.S. PATENT DOCUMENTS

| | | | | |
|---|---|---|---|---|
| 6,865,184 B2 * | 3/2005 | Thubert | .................. | H04L 29/06 370/401 |
| 6,965,184 B2 * | 11/2005 | Hediger | ................. | H02K 3/505 310/260 |
| 7,356,045 B2 * | 4/2008 | Satapati | .............. | H04L 12/4604 370/395.5 |
| 8,315,156 B2 * | 11/2012 | Droux | ................... | H04L 45/245 370/216 |
| 8,751,691 B1 * | 6/2014 | Brandwine | ......... | H04L 61/2521 709/238 |
| 2004/0107287 A1 * | 6/2004 | Ananda | ............. | H04L 29/12009 709/230 |
| 2004/0143579 A1 * | 7/2004 | Nakazawa | ........ | H04L 29/12066 |
| 2005/0005006 A1 * | 1/2005 | Chauffour | ........... | H04L 67/1027 709/223 |
| 2010/0162238 A1 * | 6/2010 | Warfield | ............... | G06F 9/5077 718/1 |
| 2010/0172302 A1 * | 7/2010 | Dunk | ........................... | 370/328 |
| 2010/0173202 A1 * | 7/2010 | Saito | ..................... | C01G 51/50 429/224 |
| 2011/0211553 A1 * | 9/2011 | Haddad | ......................... | 370/331 |
| 2011/0292857 A1 * | 12/2011 | Sarikaya et al. | .............. | 370/312 |
| 2011/0302579 A1 * | 12/2011 | Shinohara | ........... | G06F 9/45533 718/1 |
| 2012/0173656 A1 * | 7/2012 | Sorenson, III | .... | G06F 17/30156 709/217 |

* cited by examiner

*Primary Examiner* — Andrew Lai
*Assistant Examiner* — Sumitra Ganguly
(74) *Attorney, Agent, or Firm* — Davis Wright Tremaine LLP

(57) ABSTRACT

Systems and methods manage network traffic of a first protocol by use of a second protocol. Network traffic directed toward a network destination address of a first protocol is received. A mapping of addresses is utilized to determine a corresponding other network address of the second protocol. The network traffic is reconfigured to be forwarded to the intended network destination using the second protocol and the determined corresponding other network address.

26 Claims, 10 Drawing Sheets

TECHNIQUES FOR USING MAPPINGS TO MANAGE NETWORK TRAFFIC

BACKGROUND

Operating an organization often involves the operation of and interaction with computer networks that interconnect numerous computing systems. Various computing systems may, for example, support the operations of an organization, such as business. Many computing systems may be co-located (e.g., as part of a local network) and/or located in multiple distinct geographical locations (e.g., connected via one or more private or public intermediate networks). For example, an organization may operate one or more data centers that house significant numbers of interconnected computing systems. Data centers may be private data centers that are operated by and on behalf of a single organization, public data centers that are operated by entities as businesses, and/or combination private/public data centers. It is common for data centers to be participants in a communications network, such as the Internet. Data centers may, for example, be used to provide services that are accessed from outside of the data centers. Over time, organizations may develop complex computing environments that support their operations, often requiring substantial investments in technology.

Various communication protocols are used to transmit information among computing devices, such as among computing devices of a data center, between computing devices of a data center and computing devices outside of the data center, and otherwise. Often communication among computing devices includes sending units of information, often referred to as "packets," to electronic addresses corresponding to destination computing devices. Such addresses are often standardized to enable efficient routing of information and to simplify what is required to participate in a communications network. However, standardization often results in a limit in the number of addresses that are available. As a result, available addresses can be exhausted as the number of devices participating in these communication networks increases. As a result, protocols related to addresses may be updated and/or replaced with new protocols that allow for larger address spaces. At the same time, updates may create issues for organizations that have made substantial investments in infrastructure prior to the updates. In order to ensure that their systems function properly, it is often necessary to ensure that existing systems are updated and/or replaced. However, due to the complexity of various systems, such actions can be expensive, sometimes prohibitively so, both financially and in terms of resources required.

BRIEF DESCRIPTION OF THE DRAWINGS

Various embodiments in accordance with the present disclosure will be described with reference to the drawings, in which.

DETAILED DESCRIPTION

Figure 1:
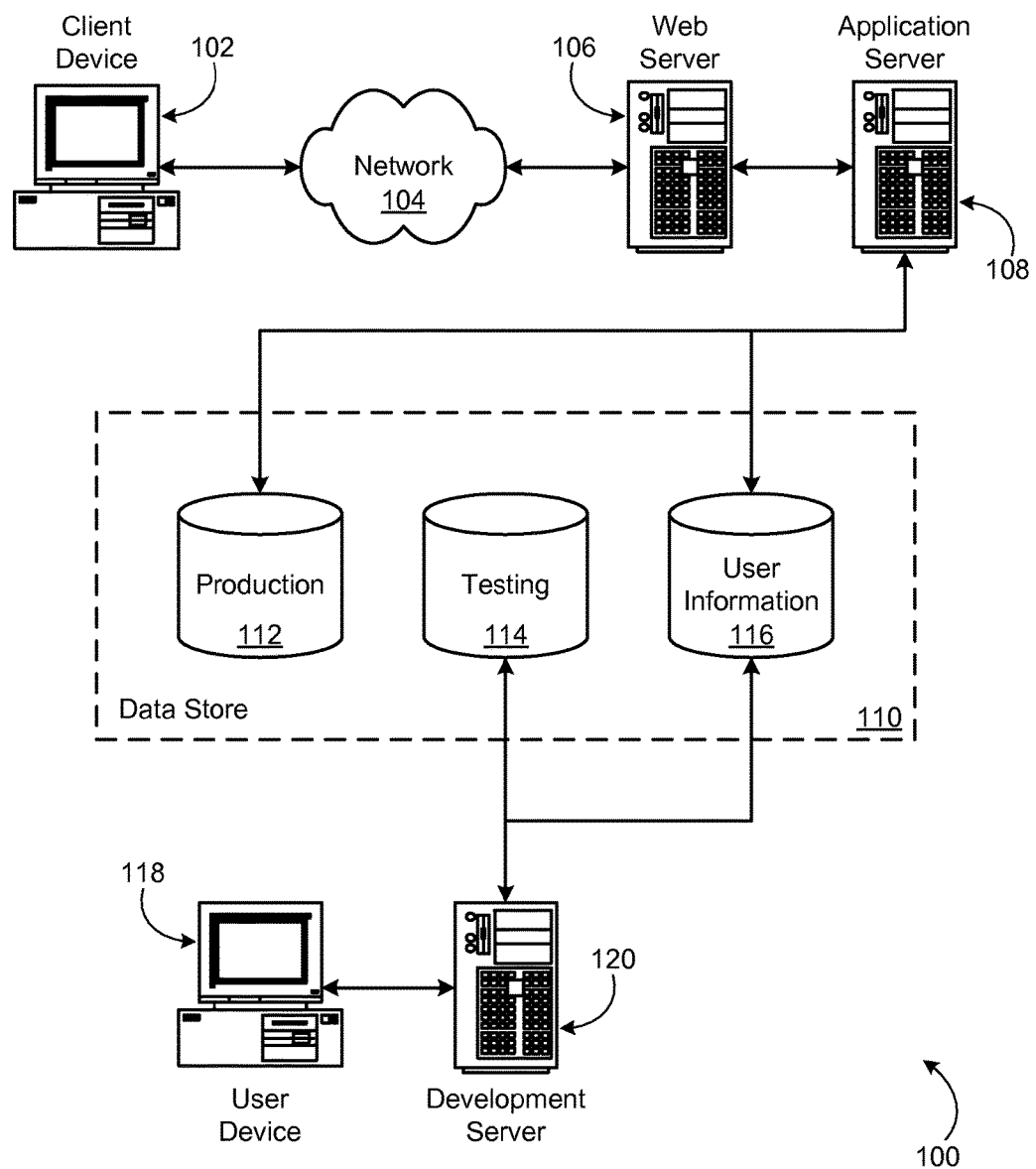
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques, including systems and methods, described herein relate to the management of network traffic received onto a network. In an embodiment, network traffic encoded according to a first protocol is received. The received network traffic may be inbound network traffic that is addressed to an address conforming to the first protocol, where the address of the first protocol may correspond to a network destination in the network. The received network traffic may be from another network, such as the Internet. In an embodiment, the network destination also corresponds to an address of conforming to a second protocol. Upon receipt of the network traffic, the address conforming to the second protocol may be determined based at least in part from the address of the first protocol.

In an embodiment, a mapping of a first set of addresses of the second protocol to a second set of addresses of the second protocol may be maintained. A computing device, e.g., a general purpose computer system, a network translation device, etc., can receive the network traffic and use the mapping to determine an address from the second set of addresses that corresponds to the determined address of the second protocol. The network traffic may be sent to the address identified using the mapping according to the second protocol. In this manner, network traffic may be reliably routed to its intended destination in instances when the network includes one or more devices that are unable to process network traffic according to the first protocol. Thus, a network that primarily supports the second protocol may be reconfigured to support the first protocol, where reconfiguration requires relatively minor changes to the network. For example, border devices configured to accept traffic from outside the network and forward traffic from within the network outside the network may be reconfigured, while leaving other devices within the network unchanged.

In an embodiment, the first protocol is Internet protocol version six (IPv6) and the second protocol is Internet protocol version four (IPv4). The received network traffic may, therefore, comprise IPv6 packets having an IPv6 destination address. The IPv6 destination address may be used to determine a corresponding IPv4 address. In an embodiment, the IPv4 address is embedded in the IPv6 address. For example, the IPv4 address may correspond to the last thirty-two bits of the IPv6 address.

The IPv4 address may be used to identify another IPv4 address that corresponds to the IPv6 address. For example, the IPv4 address determined from the IPv6 address may be a pubic Internet protocol (IP) address for a network destination. A mapping of public IP addresses to private IP addresses may be used to locate the other IPv4 address, which may be a private IP address for the network destination. The private IP addresses may be used for internal communications in the network while the public IP addresses may be used to send communication to devices in the network from outside of the network. The public IPv4 address determined from the IPv6 address may additionally be used for transmitting communications to the corresponding network destination using 6in4 tunneling techniques, described in more detail below.

The techniques described and suggested herein also have applications in addition to those described above. For example, as discussed, network addresses of a first protocol may be used to determine network addresses of a second protocol. In an embodiment, a domain name service (DNS) receives requests to associate character strings, such as domain names, with addresses conforming to the first and/or second protocol. For example, a DNS may receive a request to associate a domain name with an IPv6 address. Because an IPv4 address may be determined from the IPv6 address, the DNS may automatically create a record that associates the domain name with the IPv4 address. In this manner, the DNS may provide an IPv6 address and/or IPv4 address when responding to requests to resolve the domain name. As such, owners of various domain names have the flexibility to utilize either IPv4 or IPv6 when operating associated services.

Various approaches may be implemented in various environments for various applications. For example, FIG. 1 illustrates components of an example environment 100 for implementing aspects of the present disclosure in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
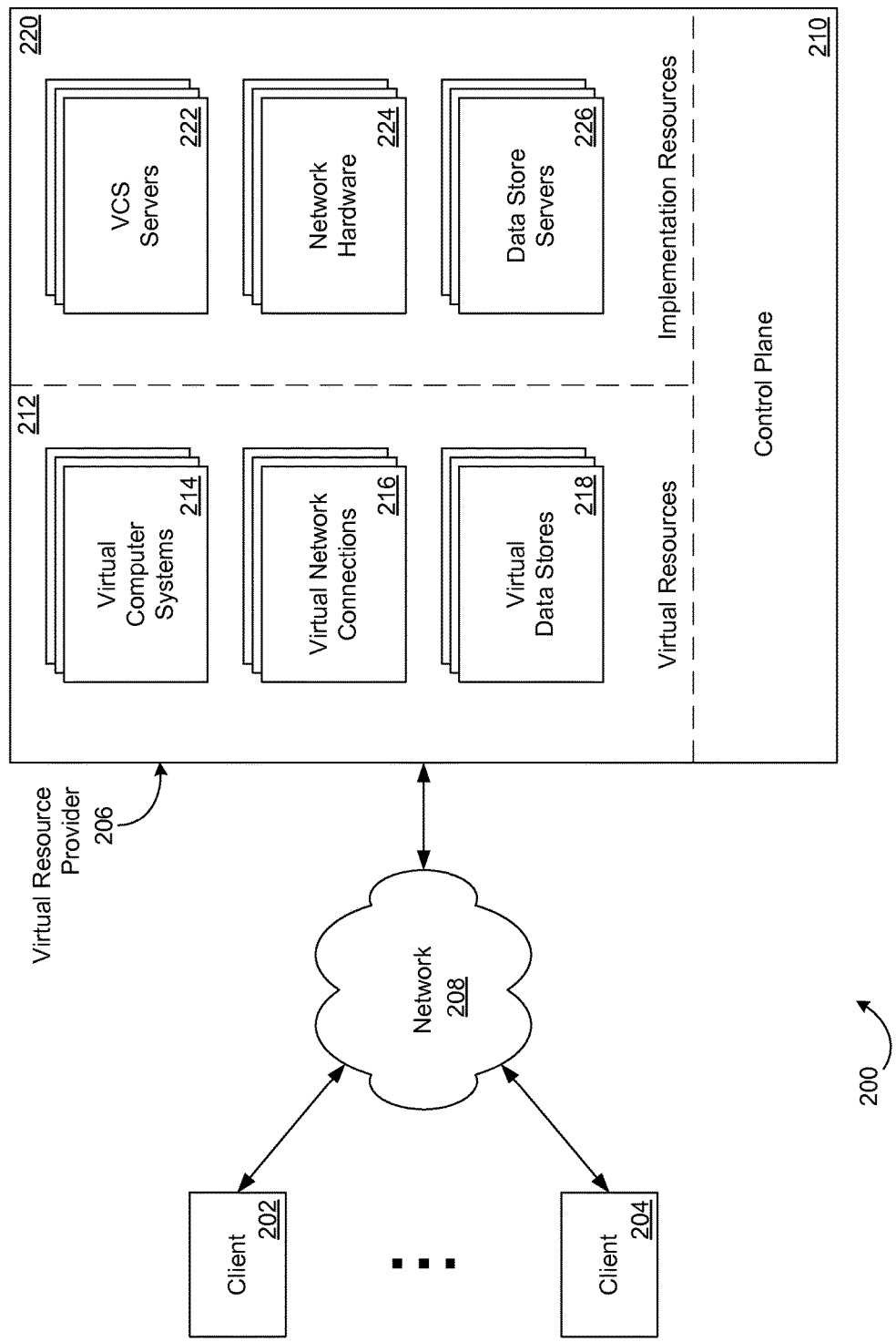
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may correspond to computing devices such as the computing device 102 of FIG. 1 and/or client programs incorporated into such computing devices. The ellipsis between the client 202 and the client 204 indicates that the virtual resource provisioning architecture 200 may include any suitable number of clients (e.g., thousands, millions, and more) although, for clarity, only two are shown in FIG. 2.

One or more of the clients 202-204 may be utilized by one or more customers of the virtual resource provider 206 to interact with the control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable virtual resources. Examples of suitable virtual resources 212 include virtual computer systems 214, virtual network connections 216, and virtual data stores 218, as well as virtual resources not shown in FIG. 2 such as specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable implementation resources 220. Each of the virtual resources 212 may be implemented by a set of the implementation resources 220. In at least one embodiment, various implementation resources of the implementation resources 220 may be configured to participate in implementing, at least in part, multiple virtual resources of the virtual resources 212. Examples of suitable implementation resources 220 include virtual computer system (VCS) servers 222, network hardware 224, and data store servers 226, as well as implementation resources not shown in FIG. 2 and/or those described in more detail below with reference to FIG. 3, FIG. 4, FIG. 5 and FIG. 6. The control plane 210 may process virtual resource provisioning requests, manage allocation of virtual resources 212 to implementation resources 220 and/or manage allocation of implementation resources 220 to virtual resources 212, as well as provide for associated cost accounting services. An example virtual resource provider control plane in accordance with at least one embodiment is described below in more detail with reference to FIG. 10.

When a particular implementation resource of the implementation resources 220 participates in the implementation of multiple virtual resources of the virtual resources 212, the implementation resource may become contended, for example, the implementation resource may receive sufficient service requests from the multiple virtual resources that request servicing time increases. Contended implementation resources can be a source of unintended and/or unauthorized information transfer between virtual resources, for example, based at least in part on variation in request servicing time. In at least one embodiment, a set of customers may establish a barrier to such information transfer to other customers of the virtual resource provider 206 at least in part by requesting that virtual resources associated with the set of customers be provisioned with dedicated implementation resources. Such barriers may lower a probability that one or more of the other customers of the virtual resource provider gains unauthorized read and/or write access to information (including unpublished information) concerning the virtual resources of the set of customers. Implementation resource dedication boundaries, defining implementation resource dedication units, may correspond to boundaries between physical and/or hardware components including boundaries due to physical barriers and/or physical separations, as well as to hard (e.g., hardware enforced) scheduling and/or timing boundaries, and suitable combinations thereof.

Figure 3:
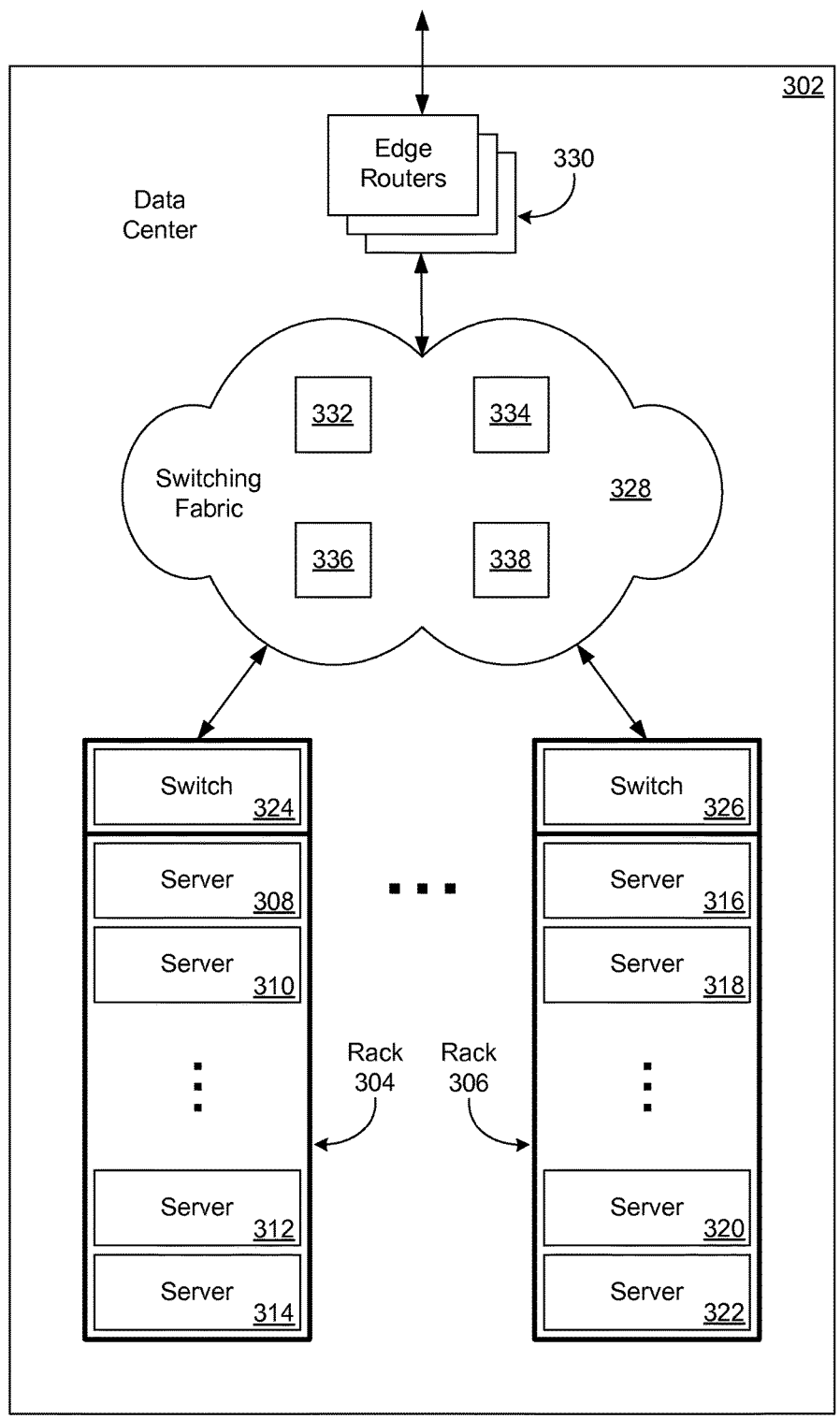
FIG. 3 is a schematic diagram depicting further aspects of the example data centers in accordance with at least one embodiment.

FIG. 3 depicts further aspects of data centers in accordance with at least one embodiment. A data center 302 may include multiple server racks 304-306. The data center 302 is an example of one or more data centers that may be used to implement one or more of the networks illustrated in FIG. 4 below. The ellipsis between the server rack 304 and the server rack 306 indicates that the data center 302 may include any suitable number of server racks although, for clarity, only two are shown in FIG. 3. Each server rack 304-306 may participate in maintaining services such as electric power and data communications to multiple server computers 308-314 and 316-322. Again, the ellipses indicate that the server racks 304-306 may include any suitable number of server computers. For example, the server computers 308-322 may include one or more VCS servers 222 (FIG. 2) and/or one or more data store servers 226. Each server 308-322 may correspond to an implementation resource dedication unit.

In FIG. 3, each server rack 304-306 is depicted as including a rack switch 324-326. The rack switches 324 and 326 may be responsible for switching packets of digital data to and from their respective sets of server computers 308-314 and 316-322. Each rack switch 324-326 may correspond to an implementation resource dedication unit. However, in the case (depicted in FIG. 3) that the server rack 304-306 includes one rack switch 324-326, dedicating the rack switch 324-326 to a particular set of customers of the virtual resource provider 206 (FIG. 2) causes dedication of the respective server rack 304-306. This is an example of dedication of a component (an implementation resource dedication sub-unit) of an implementation resource dedication unit causing dedication of the containing dedication unit ("containing unit dedication") in accordance with at least one embodiment. Implementation resources dedication units may indicate which (if any) of their sub-units cause containing unit dedication.

The rack switches 324-326 may be communicatively linked to a data center switching fabric 328 and then to a set of edge routers 330 that connects the data center 302 to one or more other computer networks including the Internet. The switching fabric may include any suitable set of networking components including multiple interconnected switches 332-338 (for clarity, only four are shown in FIG. 3) of one or more switch types arranged in one or more switching layers, as well as routers, gateways, bridges, hubs, repeaters, firewalls, computers, and suitable combinations thereof. In at least one embodiment, the rack switches 324-326 and the edge routers 330 are considered part of the switching fabric 328. The rack switches 324-326, the edge routers 330, and the components of the switching fabric 328 are examples of the network hardware 224 of FIG. 2.

Portions of the switching fabric 328, sets of switching fabric 328 networking components such as sets of the switches 332-338, and/or the edge routers 330 may correspond to implementation resource dedication units. Alternatively, or in addition, a particular set of customers of the virtual resource provider 206 (FIG. 2) may specify that virtual resources of the set of customers be provisioned with a set of dedicated data paths and/or channels (collectively, "data paths") through the switching fabric 328 and/or the edge routers 330. With respect to dedicated data paths, the implementation resource dedication units may correspond to physical data paths such as sets of wires and/or cables. Alternatively, or in addition, the implementation resource dedication units may correspond to hard scheduled communication time slots in a synchronous communication scheme.

Figure 4:
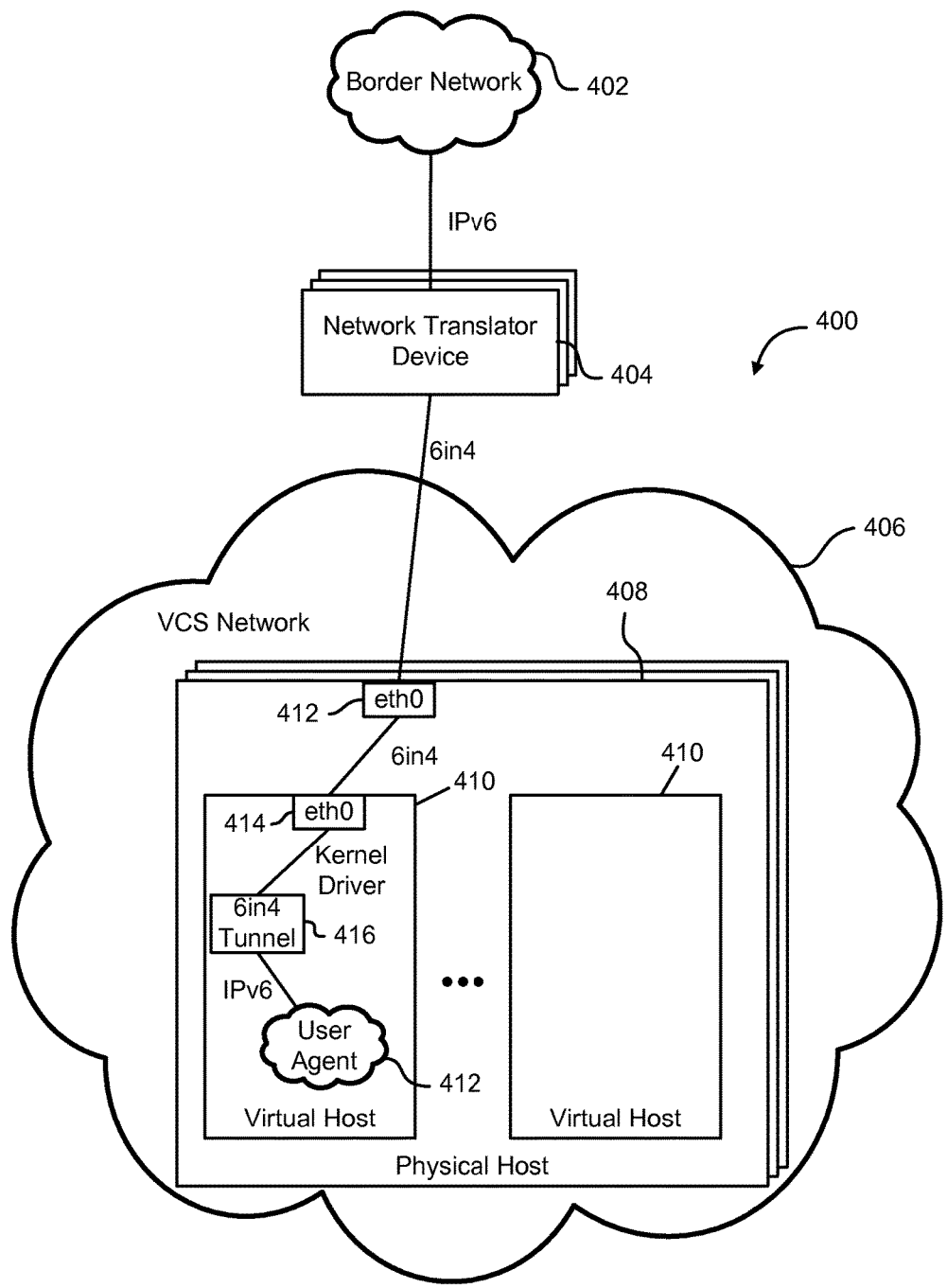
FIG. 4 shows an illustrative example of an environment in which various embodiments may be practiced.

FIG. 4 illustrates an environment 400 in which various embodiments of the present disclosure may be practiced. As illustrated, the environment 400 includes a border network 402, which may include various networking devices that enable communication with communication networks, such as public communications (including the Internet) and private communication networks, internal networks of an organization. The border network 402 may include one or more devices for interfacing with other networks, such as the Internet. The border network may include one or more Internet points of presence (POPs) that advertise a block of network addresses, such as a block of IPv6 addresses. The border network 402 may itself be the Internet and/or any other publicly addressable network. The border network 402 may also be or include a private network such that at least some network traffic between the border network 402 and a VCS network 406 passes through a network translation (NT) device 404, such as a network address translation device or other suitable device, as described in more detail below.

In an embodiment, the border network 402 receives network traffic from outside of the border network 402 and forwards the traffic appropriately. For instance, as illustrated, the border network 402 may forward network traffic to a NT device 404, which may include an interface for communicating with the border network 402. The NT device 404 may be configured with one or more processors that collectively operate in accordance with executable instructions encoded on one or more computer-readable storage media. The NT device 404 may also be a hardware device with circuitry specifically configured to perform at least the operations described herein. As noted in previous paragraphs, the NT device 404 may be able to mange IPv4 and IPv6 network traffic. The NT device 404 may also be addressable using either an IPv4 or an IPv6 address and the IPv4 address of the NT device 404 may be embedded in an IPv6 address for the NT device.

The NT device 404, in an embodiment, operates in a symmetric manner to manage incoming communications to a VCS network 406 and outgoing communications from the VCS network 406. In addition, the NT device 404, in an embodiment, utilizes a mapping between public network addresses and private network addresses. The mapping may be part of the NT device 404 or otherwise accessible to the NT device 404. For example, the mapping may be a table or other suitable data structure maintained by the NT device 404 or stored in a computer device coupled to the network translation device 404. In an embodiment, the public network addresses and private network addresses are Internet protocol version four (IPv4) network addresses, although embodiments of the present disclosure may be adapted to operate in connection with other types of network addresses. An anycast address or CIDR block may be advertised for the NT device 404, although a static address resolution protocol may be used. In addition, the NT device 404 may work asymmetrically, only managing incoming network traffic. In such an embodiment, another device (not pictured) may handle outgoing network traffic.

The public network addresses may be addresses of network destinations (such as computing systems) to which devices may direct traffic to utilize a public communications network, such as the Internet. For example, a device from outside the VCS network 406 (e.g., a mobile device, a computer system, etc.) may send a communication to a device (e.g., a computer system running a service such a data storage service, an email server, etc.) in the VCS network 406 by addressing the communication to a public network address of the device in the VCS network. The private network addresses may be addresses of network destinations in the VCS network that are used among the devices in the VCS network and possibly other devices that work in connection with the VCS network, such as the NT device 404. Internal communications among devices in the VCS network 406 may be addressed according to private network addresses.

As noted, the NT device 404, in an embodiment, utilizes a mapping between public network addresses and private network addresses when managing network traffic. The mapping may be a one-to-one mapping wherein each public network address corresponds to exactly one private network address, although other mappings where one or more public network addresses may be mapped to more than one private network addresses and/or one or more private network addresses may be each mapped to more than one public network address are considered as being within the scope of the present disclosure.

The NT device 404, in an embodiment, receives incoming network traffic (such as IPv4 packets and/or IPv6 packets) addressed to public network addresses, uses the mapping to determine corresponding private network addresses, and forwards the network traffic with translated addresses to their destinations. For example, the NT device may receive an IPv4 packet with a public IPv4 Internet protocol (IP) address destination, determine a corresponding private IP address using the mapping, change the packet to have the private IP address as the destination address, and forward the changed IPv4 packet to the private IP address. The NT device 404 may use a 6to4 tunneling protocol for transmitting IPv6 traffic to IPv4 endpoints. It should be noted that by forwarding a communication to a network destination the communication may be provided directly to the network destination or indirectly, such as through one or more intermediate devices. As discussed below, the NT device 404 may perform additional actions. If handling outgoing traffic, the NT device 404 may perform similar procedures when receiving outgoing traffic. For instance, the NT device 404 may translate a private source address of an IPv4 packet to a public source address.

As noted, the NT device 404, as illustrated in FIG. 4, forwards network traffic to a network destination. The network destination may be, for example, a device in the VCS network 406. As illustrated, the VCS network 406 includes a plurality of physical hosts 408 that each implement one or more virtual hosts 410. A physical host 408 may be a hardware device including memory and one or more processors that are used to implement one or more virtual hosts. The physical host 408 may include one or more network interface cards 412 and/or other network interfaces that enable the physical host to communicate with one or more other devices in the VCS network. In addition, the VCS network may include other network devices, including devices discussed above. One or more (perhaps all) of the devices in the VCS network may lack the ability to communicate using a protocol that was used to send a communication to an endpoint in the VCS network. For example, one or more of the physical hosts 408 in the VCS network may be configured to communicate using the IPv4 protocol but may be unable to communicate using the IPv6 protocol. Receipt of an IPv6 packet by such a device may cause malfunction, error, or, generally, less than optimal performance.

It should be noted that the VCS network 406 may be configured in a variety of manners. In an embodiment, the VCS network includes a plurality of physical hosts distributed among a plurality of data centers throughout a geographic region. However, the VCS network may be confined to a single data center (or, generally, facility).

As noted, a virtual host 410 may be a virtual computing system implemented by a physical host. The physical host 408 may, but does not necessarily, simultaneously implement multiple virtual hosts 410. The physical host 408 may include, for example, a hypervisor that manages the computing resources of the physical host 408, allocating resources for use by the virtual hosts 408 appropriately. The virtual host 410 may include a virtual network interface card 414 and/or other network interface that enables communication with the network interface card 412 of the physical host 408. The virtual host 410 may also include other virtual devices, such as a 6in4 tunneling device 416 and a user agent 418. The 6in4 tunneling device 416 may receive IPv6 network traffic encapsulated in IPv4 packets, extract the IPv6 network traffic and forward the IPv6 network traffic to the user agent 418 for processing. The user agent 418 may be a client application that implements a network protocol. The user agent 418, for example, may work in connection with a virtual load balancer implemented by the virtual host 410.

It should be noted that, while various embodiments of the present disclosure are discussed in connection with various virtualization techniques, the scope of the present disclosure is not limited to such illustrative embodiments. For example, a network endpoint may be a virtual device or a physical device. While a VCS network is shown for illustration, techniques described herein may be used with other types of networks, such as networks where endpoints are physical devices or networks that include both physical and virtual endpoints. In addition, while FIG. 4 shows a specific implementation of a virtual host 410 that utilizes a kernel driver in connection with providing IPv6 network traffic to a user agent 412, other configurations of virtual hosts are considered as being within the scope of the present disclosure.

As discussed in previous paragraphs, the NT device 404 may perform various functions when managing network traffic. As illustrated in FIG. 4, the NT device 404 may receive IPv6 traffic, utilize 6to4 tunneling techniques that include performing 6in4 encapsulation and network address translation, and forward the encapsulated and translated traffic accordingly. In this manner, devices outside of the VCS network 406 can send communications into the VCS network utilizing IPv6 regardless of whether the VCS network can completely support IPv6. These actions are discussed in more detail below. The NT device 404 may also be configured to perform other actions. For example, the NT device 404 may additionally receive IPv4 or other network traffic and route the traffic to the appropriate destination.

Figure 5:
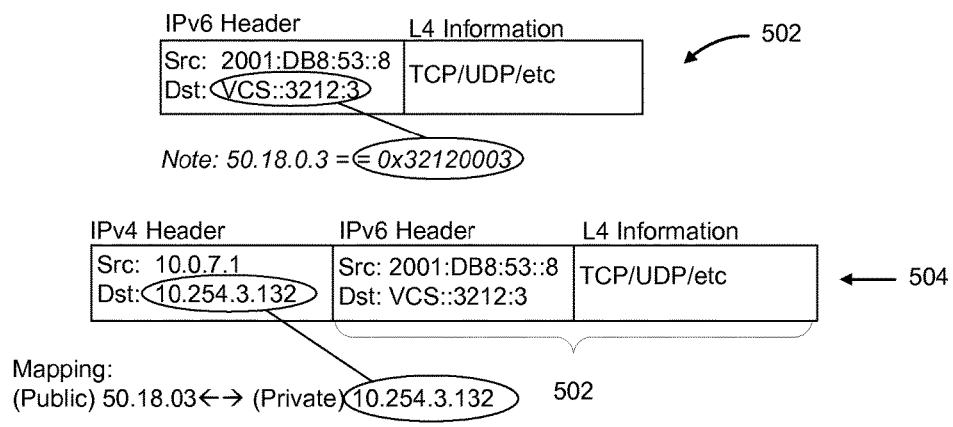
FIG. 5 shows an illustrative example of 6in4 encapsulation, in accordance with at least one environment.

Turning to FIG. 5, it illustrates a specific example of how a NT device, such as the NT device 404 discussed above in connection with FIG. 4, may process IPv6 traffic. In particular, FIG. 5 illustrates a representation of an example IPv6 packet 502 that has been received by a NT device. In this specific example, the received IPv6 packet 502 includes an IPv6 source address of 2001: DB8:53::8 and an IPv6 destination address of VCS::3212:3 encoded in an IPv6 header, where the VCS address represents an IPv6 prefix for the VCS network. The IPv6 packet 502 also includes other information such as header information and a payload. The destination address, in this example, is a public IPv6 address for a device in an internal network, such as the VCS network 406 discussed above in connection with FIG. 4.

In a specific embodiment, the last thirty-two bits of a public IPv6 address assigned to a device of the VCS network correspond to a public IPv4 address associated with the device. As illustrated in FIG. 5, the public IPv4 address may be directly ascertainable from the IPv6 address by extracting the last (bottom) thirty-two bits. In this illustrated example, the last thirty-two bits of the public IPv6 address are 3212:3 which, when written in hexadecimal notation, is 0x32120003. When converted to decimal notation, the suffix of the IPv6 address corresponds to an IPv4 address of 50.18.0.3. It should be noted that the public IPv4 address need not be directly ascertainable from the last thirty-two bits of an IPv6 address, but may be indirectly ascertainable in an alternative configuration. For example, the last thirty-two bits may be processed by a decoding algorithm that provides an IPv4 address. Further, while using the last thirty-two bits of an IPv6 address is convenient, an IPv4 address may be encoded in an IPv6 address using any thirty-two bits of the IPv6 address. Further, an IPv4 address need not be encoded in an IPv6 address; rather the IPv6 address may merely correspond to an IPv4 address and the correspondence may be stored in a data store accessible to the NT device.

Returning to the example illustrated by FIG. 5, the public IPv4 address (50.18.0.3) obtained using at least the destination IPv6 address of the received IPv6 packet 502 is mapped to a private IPv4 address of 10.254.3.132. Accordingly, in an embodiment, the NT device encapsulates the IPv6 packet 502 in an IPv4 packet 504 in order to forward the IPv6 packet to the destination device. In an embodiment, encapsulating the IPv6 packet 502 in the IPv4 packet 504 is performed using 6in4 encapsulation wherein an appropriate IPv4 header is added to the IPv6 packet. The IPv4 header may be configured with total length and other values that are appropriate for the particular IPv6 packet being encapsulated. The total length value, for instance, may correspond to the length of the combination of the IPv6 packet and the IPv4 header. Other values of the IPv4 header may be set appropriately and some may be repeated from the IPv6 header.

As illustrated, the IPv4 header added to the IPv6 packet includes a IPv4 source address and destination address. The IPv4 source address in the IPv4 header may be a private IPv4 address for the NT device or for another device that is used for managing outbound network traffic. The IPv4 destination address is the private IPv4 address determined according to the mapping, namely 10.254.3.132.

Figure 6:
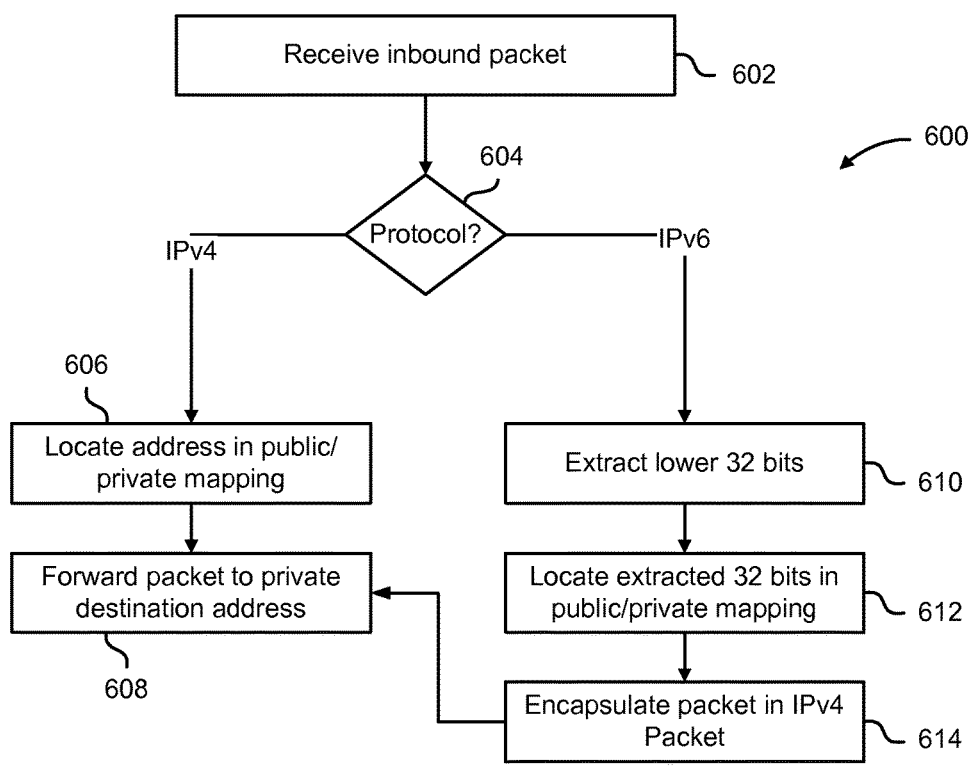
FIG. 6 shows an illustrative example of a process for managing inbound network traffic in accordance with at least one embodiment.

FIG. 6 shows an illustrative example of a process 600 that may be performed to manage incoming traffic in accordance with an embodiment. Some or all of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

The process 600 may be performed by a NT device in an environment such as the environment discussed above in connection with FIG. 4, or variations thereof. For instance, a device performing the process 600 may be involved in managing traffic from a public network to a private network. In an embodiment, the process 600 includes receiving 602 an inbound packet. In a specific example, executable instructions can run on a processor of the NT and process data indicative of the inbound packet received from a network interface card. The inbound packet may have originated from a device outside of a private network. When the inbound packet is received, a protocol to which the received inbound packet conforms may be determined 604. In the specific example illustrated by FIG. 6, a determination is made as to whether the received inbound packet is an IPv4 packet or an IPv6 packet. For example, a processor of a NT device may read the first four bits of the received packet and, if the first bits are 0100, determine that the received packet is an IPv4 packet, but if the first four bits are 0110, determine that the received packet is an IPv6 packet. It may also be determined whether the packet is encoded according to another protocol and the process 600 may be adapted to work with such protocols, although such an illustration of such is omitted from the figure for the purpose of illustration.

In an embodiment, if it is determined that the received inbound packet is an IPv4 packet, a private IPv4 address is determined 606 using a mapping between public IPv4 addresses and private IPv4 addresses, such as described above. The inbound packet is then forwarded 608 to the determined private IPv4 address. As discussed, forwarding the inbound packet to the private IPv4 address may include performing a network address translation where the destination address of the inbound packet (the public IPv4 address for the destination) is replaced with the determined private IPv4 address before sending the inbound packet to another device en route to the destination (or directly to the destination if such a connection is available).

Turning to decision point 604 and operation 610, if, however, it is determined that the received inbound packet is an IPv6 packet, in an embodiment, the last thirty-two bits of the IPv6 destination address of the received inbound packet are extracted to determine a corresponding IPv4 destination address. As noted in previous paragraphs, the corresponding IPv4 address may be determined in other ways, e.g., a different set of bits could be used to determine the corresponding IPv4 destination address. Continuing with the description of the figure, the process 600 additionally includes operation 612 which indicates that the network translator device can include means for determining a private IPv4 address for the received inbound packet using a mapping of public IPv4 addresses with private IPv4 addresses, e.g., the network translator device can include executable instructions that upon execution by a processor cause the processor to determine a private IPv4 address for the received inbound packet. It should be noted, however, that other ways of determining the private IPv4 address (or other private address) are considered as being within the scope of the present disclosure. For example, in an embodiment, a mapping that maps public IPv6 addresses to private IPv4 addresses may be used. Such a mapping may be together with or separate from another mapping that maps public IPv4 addresses to private IPv4 addresses. Generally, any suitable way of determining a private network address for an inbound packet may be used.

In an embodiment, the received inbound IPv6 packet is then encapsulated 614 into an IPv4 packet, such as by using a 6in4 technique, described above. The encapsulated IPv6 packet may have an IPv4 header that identifies a destination address that is the determined private IPv4 address. As discussed above, the IPv4 header of the encapsulated IPv6 packet may have a source network address that corresponds to a device operable to process outbound network traffic. The encapsulated IPv6 packet, in an embodiment, is then forwarded 608 to the destination according to the private IPv4 destination in the IPv4 header of the encapsulated IPv6 packet.

Figure 7:
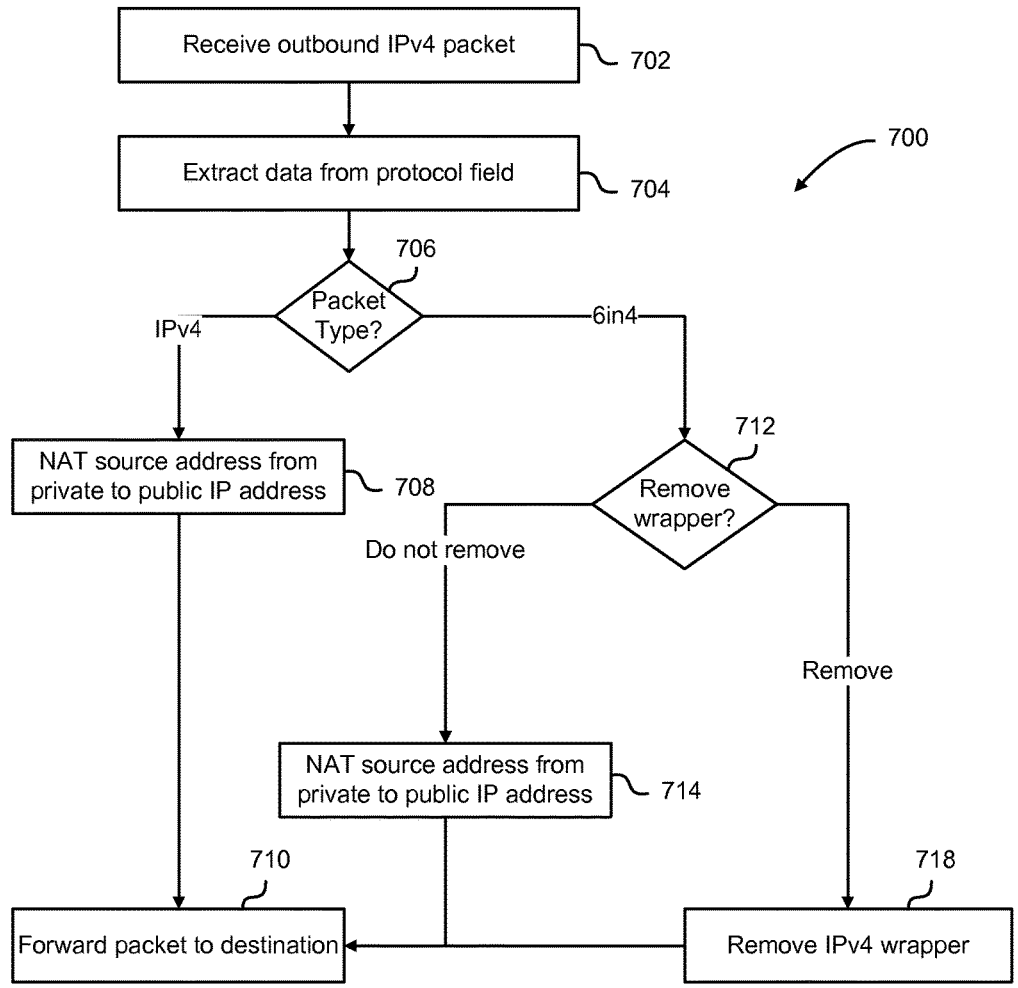
FIG. 7 shows an illustrative example of a process for managing outbound network traffic in accordance with at least one embodiment.

In various embodiments of the present disclosure, a device such as the network translator device may also process outbound network traffic to ensure that outbound traffic is configured appropriately. FIG. 7, accordingly, shows an illustrative example of a process 700 that may be used when managing outbound traffic. Turning to the process 700, it shows an operation for receiving 702 an outbound IPv4 packet. The outbound IPv4 packet may be received, for example, by an NT device or other device of a data center. IPv4 packets include a protocol field that encodes protocol information about themselves. In an embodiment, data is extracted 704 from the protocol field of the received outbound IPv4 packet. A determination may then be made 706 regarding the packet type based at least in part on the extracted data from the protocol field. For instance, as illustrated in FIG. 7, the process 700 includes an operation for determining whether the protocol field indicates that the received outbound packet is an 6in4 packet, that is, a IPv6 packet encapsulated in an IPv4 packet. In a specific example, the determination may be made based at least in part on whether the extracted data from the protocol field indicates "protocol 41," which corresponds to IPv6 according to the list of IP protocol numbers maintained by the Internet Assigned Numbers Authority.

Continuing with the description of the operational procedure 700, operation 708 illustrates that if it is determined that the packet type is not a 6in4 packet type, the source address from the received outbound IPv4 is translated to a public IP address corresponding to the source address of the received outbound IPv4 packet. The source address of the received outbound IPv4 packet may be, for example, a private IPv4 address of a device from which the packet originated. A mapping, such as described above, may be used to determine the public IPv4 address to which the outbound packet is translated. Once a network address translation has been performed, operation 710 shows that a device can include means for forwarding the packet to its destination. The packet may be, for example, released onto the Internet where the packet will be routed appropriately.

Continuing with the description of the figure, if a determination is made that the received outbound IPv4 packet is a 6in4 packet care may need to be taken to ensure that the outbound packet is processed correctly. For example, care may need to be taken to ensure that the 6in4 packet is forwarded to its destination as a 6in4 packet, if such was intended, while ensuring that a 6in4 packet is converted to an IPv6 packet, if that was intended. Accordingly, in an embodiment, a determination is made 712 whether to remove a wrapper from the received outbound 6in4 packet, that is, convert the 6in4 packet to a IPv6 packet. The determination may be made in any suitable manner. For example, a determination to remove the outer wrapper may be made after identifying whether an embedded IPv6 address includes a certain prefix and verifying that the source address of the IPv4 header matches an embedded IPv6 suffix using a mapping, such as a mapping described above. Continuing with the description of FIG. 7, if it is determined not to remove the wrapper, the source address of the 6in4 packet is translated 714 to a corresponding public address and forwarded 710 to its destination as a 6in4 packet. If, however, it is determined to remove the wrapper, the IPv4 header is removed 716 from the 6in4 packet and the remaining IPv6 prior to forwarding the IPv6 packet to its destination.

Figure 8:
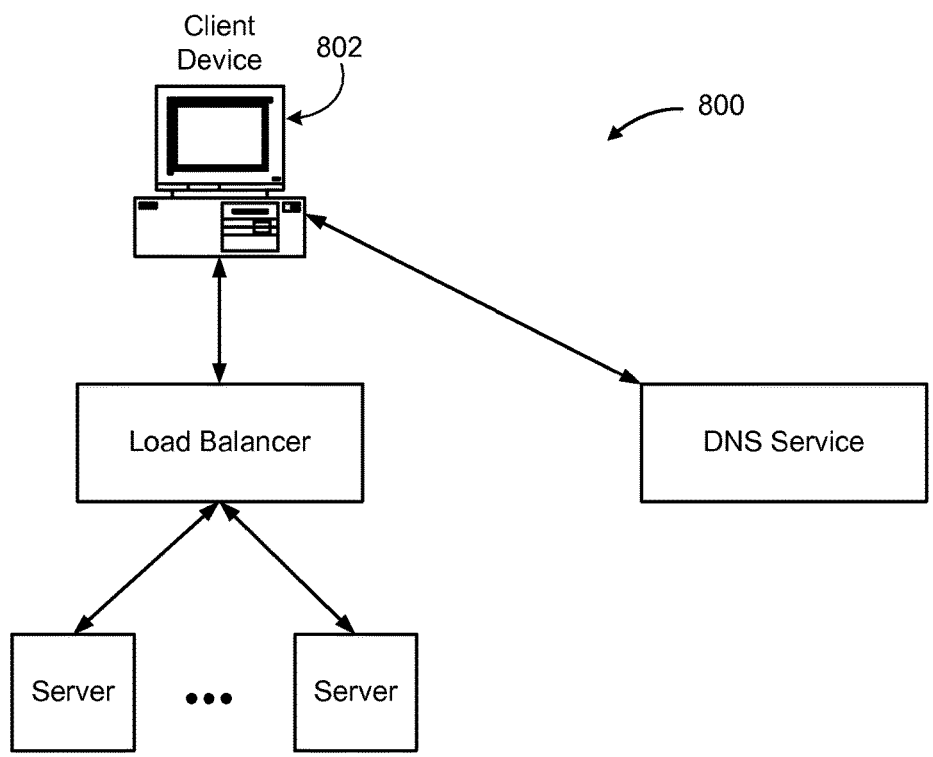
FIG. 8 shows an illustrative example of an environment in which various embodiments may be practiced.

Embodiments of the present disclosure also relate to the use of a domain name service (DNS) in connection with IPv4 and IPv6 addresses. FIG. 8 shows an illustrative example of an environment 800 which may utilize various aspects of the present disclosure. For example, the environment 800 includes a client device 802 that may communicate with other devices in a network. During its operation, the client device 802 may require information from an information resource and may utilize a domain name to access information resource. To access the other device, the client device 802 may provide the domain name to a DNS service 804 that is operable to respond by providing an IP address that corresponds to the domain name. The request may specify whether the address provided in response should be an IPv4 address or IPv6 address. Specifying whether the address in response is an IPv4 or IPv6 address may include specifying an A record corresponding to an IPv4 address or an AAAA record specifying an IPv6 address.

The client device 802 may receive a response from the DNS service that includes the requested IP address. In the example illustrated in FIG. 8, the IP address received by the client device 802 is the public IP address of a load balancer 806 that distributes requests among a plurality of servers 808 used to implement the information resource. The load balancer 806 may be implemented on a virtual host, such as described above, although the load balancer may be a physical device. However, embodiments of the present disclosure may be used to provide IP addresses for other devices, whether physical or virtual. An operator of the information resource operated by the servers 808 may enable a service by using the domain name of the load balancer 806 as a destination for requests. The client, for example, may direct requests to the servers 808 by submitting the requests to the load balancer 806 using an IP address provided by the DNS service 804.

Figure 9:
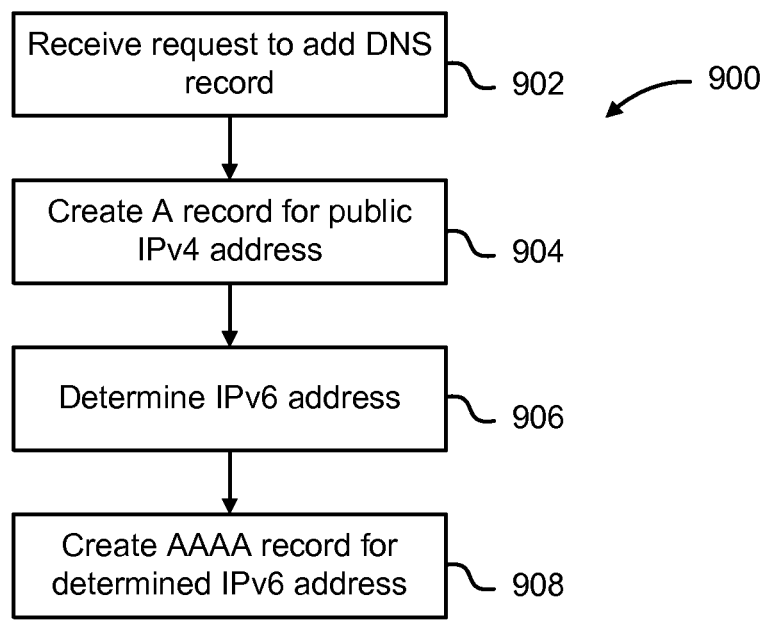
FIG. 9 shows an illustrative example for creating DNS records, in accordance with at least one embodiment.

A DNS service, such as illustrated in FIG. 8, may be used to enable the user of IPv6 over networks that operate using IPv4, such as in a manner described above. FIG. 9, for example, shows an illustrative example of a process 900 for managing DNS records that may be used in connection with the various embodiments above. In an embodiment, the DNS service 804 may be configured to map a domain name of a device (such as a load balancer) to an IP address. Accordingly, in an embodiment, the process 900 includes receiving 902 a request to add a DNS record for a device. The request may be for, as an example, a domain of the form ipv6.<domain> or dualstack.<domain> where <domain> represents a domain name. The request, in an embodiment, includes a public IPv4 address for the device.

In an embodiment, in response to the request, an A record is created 904 for the received IPv4 address. In addition, an IPv6 AAAA record may also be created for the IPv4 address automatically, using the above techniques. Creating the IPv6 AAAA record may include determining 906 the IPv6 address from the IPv4 address. For example, in an embodiment, the IPv4 address is embedded into the IPv6 address, such as by embedding the IPv4 address in the last thirty-two bits of the IPv6 address or, generally, in any suitable manner. If the IPv4 address is embedded into the suffix of the IPv6 address, the prefix of the IPv6 address may correspond to a subspace of an address space allocated to an organization that owns (controls) the IPv6 address being created. Once the IPv6 address is determined 906, an AAAA record for the determined IPv6 address may then be created 908. Thus, a single request may result in both an A record and AAAA record being created for a domain name. In this manner, a DNS system originally programmed to provide records for an IPv4 network may be easily reconfigured, with minimal changes, to additionally provide addresses for use in an IPv6 network.

Figure 10:
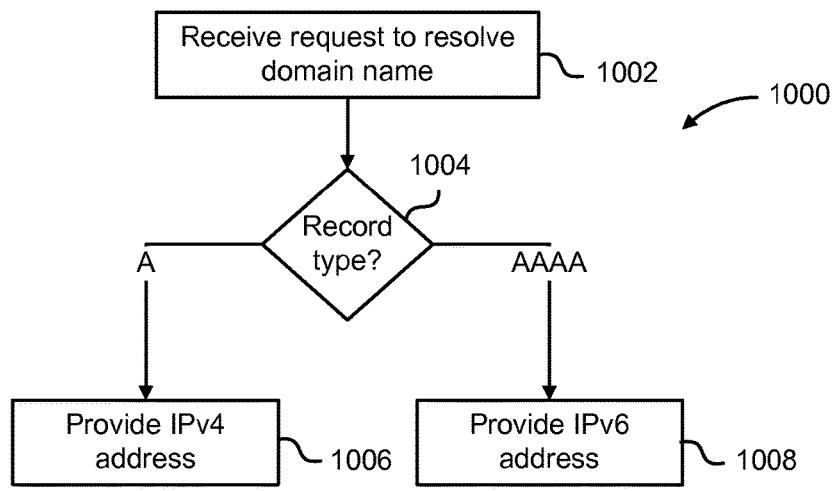
FIG. 10 shows an illustrative example of a process for resolving domain names in accordance with at least one embodiment.

FIG. 10 illustrates an example process 1000 that may be used to resolve domain names in accordance with the various embodiments described herein. Turning to the figure, the process 1000 includes receiving 1002 a request to resolve a domain name. Upon receipt of the request, the record type requested may be determined 1004 based at least in part on the request. If the record type is an A record, an IPv4 address may be provided 1006 in response. If the request is for an AAAA record, an IPv6 request may be provided in response.

Variations of the above descriptions are considered as being within the scope of the present disclosure. For example, the above description describes various aspects of the disclosure using IPv4 and IPv6 protocols as illustrative examples. However, the described technique may be adapted for use with other protocols. Further, while the illustrative embodiments illustrate inbound traffic as one protocol (IPv6) that is routed in an internal network using another protocol (IPv4), embodiments of the present disclosure also apply when the inbound traffic uses the same protocol as an internal network. In addition to the foregoing, techniques additional to those discussed above may also be used in connection with the various embodiments. For example, the above description describes encapsulating IPv6 packets in IPv4 packets. An IPv4 packet that encapsulates an IPv6 packet may itself be encapsulated or otherwise modified for various purposes, including, but not limited to, additional network overlays.

As another example of variations considered as being within the scope of the present disclosure, the above description discusses various techniques in terms of a single network endpoint. The techniques described herein are applicable for multiple network endpoints. For example, as discussed, a data center may house multiple servers. The techniques described herein may be used to manage network traffic to multiple endpoints. Further various endpoints may correspond to devices operated on behalf of different customers of a multi-tenant computing resources provider, such as a virtual computing resource provider, although the scope of the present disclosure is not limited to such embodiments.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing network traffic, comprising:
    receiving, at a first device of a virtual computing resource service provider, a plurality of Internet protocol version six packets that each have a destination Internet protocol version six address; and
    for each received Internet protocol version six packet of at least a subset of the received plurality of Internet protocol version six packets:
        extracting an Internet protocol version four address from the destination Internet protocol version six address of the received Internet protocol version six packet;
        determining, based at least in part on a mapping of public Internet protocol version four addresses to private Internet protocol version four addresses, a private Internet protocol version four address for the received Internet protocol version six packet;
        encapsulating the received Internet protocol version six packet of the at least the subset within an Internet protocol version four packet that has the determined private Internet protocol version four address as a destination address; and
        forwarding the encapsulated received Internet protocol version six packet to a network destination corresponding to the determined private Internet protocol version four address by at least:
            providing the encapsulated received Internet protocol version six packet to a second device that executes a hypervisor-implemented virtual computer system corresponding to the network destination, the second device configured to:
                deencapsulate the encapsulated received Internet protocol version six packet at the second device to obtain a deencapsulated Internet protocol version six packet, and
                provide the deencapsulated Internet protocol version six packet from a hypervisor of the second device to a program implemented by the virtual computer system based at least in part on the deencapsulated Internet protocol version six packet.

2. The computer-implemented method of claim 1, wherein the encapsulating of the received Internet protocol version six packet includes adding at least one Internet protocol version four header to the received Internet protocol version six packet.

3. The computer-implemented method of claim 1, wherein the extracted Internet protocol version four address is embedded within the Internet protocol version six address.

4. The computer-implemented method of claim 1, further comprising:
    receiving, at the first device, an Internet protocol version four response to the received Internet protocol version six packet;
    modifying the response to be an Internet protocol version six response; and
    forwarding the modified Internet protocol version six response to a response destination.

5. The computer-implemented method of claim 1, wherein the network destination is a load balancer.

6. A computer-implemented method for managing network traffic, comprising:
    receiving, at a first device of a virtual computing resource service provider, an information unit organized according to a first protocol, the information unit having a first destination identifier and the first protocol having a corresponding first address space;
    determining a different destination identifier based at least in part on the first destination identifier;

identifying, based at least in part on the determined different destination identifier, a mapping of members of a first set of destination identifiers to members of a second set of destination identifiers, a second destination identifier;

changing the received information unit to be organized according to a second protocol and to include the identified second destination identifier, the second protocol having a corresponding second address space that is smaller than the first address space; and forwarding the changed received information unit to a network destination corresponding to the second destination identifier by at least:

providing the changed received information unit to a second device executing a hypervisor, the second device implementing a virtual computer system corresponding to the network destination, and the second device configured to change the changed received information unit to be organized according to the first protocol corresponding to the network destination; and providing, from the hypervisor of the second device, the information unit organized according to the first protocol to a program implemented by the virtual computer system based at least in part on the information unit organized according to the first protocol.

7. The computer-implemented method of claim 6, wherein the information unit is an Internet protocol version six packet.

8. The computer-implemented method of claim 7, wherein the first destination identifier is an Internet protocol version six address comprising a set of bits and wherein the determined different destination identifier consists of a subset that is less than all of the set of bits.

9. The computer-implemented method of claim 6, wherein the second protocol is Internet protocol version four.

10. The computer-implemented method of claim 6, wherein the forwarding of the changed received information unit to the network destination includes routing the changed received information unit over a network that includes at least one device unable to route network traffic according to the first protocol.

11. The computer-implemented method of claim 6, further comprising:

receiving, at the first device, a second information unit that is organized according to the second protocol;

changing the received second information unit to a third information unit that is organized according to the first protocol; and forwarding the changed received second information unit.

12. The computer-implemented method of claim 11, wherein the second information unit is a response to the received information unit.

13. The computer-implemented method of claim 11, further comprising:

determining, based at least in part on the first destination identifier, a corresponding destination identifier of the second protocol that is a member of the first set of destination identifiers; and wherein the identifying of the second destination identifier is based at least in part on the determined corresponding destination identifier and the mapping.

14. The computer-implemented method of claim 13, further comprising:

receiving, at the first device, a request to associate the network destination with a character string in a domain name service; and in response to the request, associating both the first destination identifier and the corresponding destination identifier with the character string in the domain name service to enable the domain name service to respond to requests to resolve the character string by providing the first destination identifier when the requests are of a first request type and providing the corresponding destination identifier when the requests are of a second request type.

15. A system for managing network traffic, comprising:
one or more processors; and
memory including instructions executable by the one or more processors to manage network traffic by causing the system to at least:

receive, at a first device of a virtual computing resource service provider, information units organized according to a first protocol, the information units each having a first destination identifier and the first protocol having a corresponding first address space; and for each information unit of at least a subset of the received information units:

identify, based at least in part on a determined destination identifier and a mapping of members of a first set of destination identifiers to members of a second set of destination identifiers, a second destination identifier corresponding to the first destination identifier of the information unit, the determined destination identifier having been determined based at least in part on the first destination identifier;

change the received information unit to be organized according to a second protocol and to include the identified second destination identifier, the second protocol having a corresponding second address space that is smaller than the first address space;

forward the changed received information unit to a second device executing a hypervisor, the second device implementing a virtual computer system corresponding to a network destination corresponding to the second destination identifier;

change, at the second device, the forwarded changed received information unit to be organized according to the first protocol corresponding to the forwarded changed received information unit; and provide, from the hypervisor of the second device, the information unit organized according to the first protocol to a program implemented by the virtual computer system based at least in part on the information unit organized according to the first protocol.

16. The system of claim 15, wherein the first protocol is Internet protocol version six and wherein the second protocol is Internet protocol version four.

17. The system of claim 15, wherein the system is additionally configured to receive and forward information units organized according to the second protocol.

18. The system of claim 15, wherein the determined destination identifier comprises a set of bits extracted from the first destination identifier of the information unit, another destination identifier for the information unit, the other destination identifier being a member of the first set of destination identifiers; and wherein the identified second destination identifier corresponds to the determined other destination identifier by the mapping.

19. The system of claim 15, further comprising a domain name system that, in response to a request to map a specified character string to a specified destination identifier of the second address space, maps the specified character string to correspond to both the first destination identifier and a second destination identifier, corresponding to the specified destination identifier, of the first address space.

20. One or more non-transitory computer-readable storage media having stored thereon executable instructions that, if executed by one or more processors of a computer system, enable the computer system to at least:
receive an information unit organized according to a first protocol, the information unit having a first destination identifier, the first protocol having a corresponding first address space;
identify, based at least in part on a determined destination identifier and a mapping of members of a first set of destination identifiers to members of a second set of destination identifiers, a second destination identifier that corresponds to the first destination identifier, the determined destination identifier having been determined based at least in part on the first destination identifier;
modify the received information unit to be organized according to a second protocol and to include the identified second destination identifier, the second protocol having a corresponding second address space that is smaller than the first address space, the modifying generating a changed received information unit;
forward the changed received information unit to a computing device that executes a hypervisor, the computing device implementing a virtual computer system corresponding to a network destination corresponding to the second destination identifier;
change, at the computing device corresponding to the network destination, the changed received information unit to be organized according to the first protocol; and
provide, from the hypervisor of the computing device, the information unit organized according to the first protocol to a program implemented by the virtual computer system based at least in part on the information unit organized according to the first protocol.

21. The one or more computer-readable storage media of claim 20, wherein the first protocol is Internet protocol version six and wherein the second protocol is Internet protocol version four.

22. The one or more computer-readable storage media of claim 20, wherein the identifying of the second destination identifier includes extracting information from the first destination identifier and using the extracted information to locate the second destination identifier in the mapping.

23. The one or more computer-readable storage media of claim 22, wherein the extracted information is a destination identifier according to the second protocol that may be used as an alternative to the first destination identifier.

24. A computer-implemented method for managing network traffic, comprising:
receiving, according to a first communication protocol, network traffic addressed to a first network destination identifier, the first network destination identifier being of a first identifier space;
determining, based at least in part on a mapping of a first set of identifiers to a second set of destination identifiers, a second network destination identifier that corresponds to a different identifier that is determined based at least in part on the first network destination identifier, the second network destination identifier being of a second identifier space that is smaller than the first identifier space;
forwarding, according to a second communication protocol, the network traffic to a device executing a hypervisor, the device implementing a virtual computer system associated with the second network destination identifier, the hypervisor supporting a virtual computer system corresponding to the second network destination identifier;
modifying, at the device, the network traffic to be in accordance with the first communication protocol; and
providing, from the hypervisor of the device, the network traffic modified in accordance with the first communication protocol to a program implemented by the virtual computer system based at least in part on the network traffic modified in accordance with the first communication protocol.

25. The computer-implemented method of claim 24, wherein the first communication protocol is Internet protocol version six, wherein the second communication protocol is Internet protocol version four, wherein the first network destination identifier is an Internet protocol version six address, and wherein the second network destination identifier is an Internet protocol version four address.

26. The computer-implemented method of claim 24, wherein the first set of identifiers is a set of public destination identifiers, wherein the second set of destination identifiers is a set of private destination identifiers, and wherein the second network destination identifier is a member of the second set of destination identifiers.

* * * * *